(12) United States Patent
Hattori et al.

(10) Patent No.: US 6,182,530 B1
(45) Date of Patent: Feb. 6, 2001

(54) SHIFT LEVER DEVICE

(75) Inventors: Kanehiro Hattori; Shigetoshi Tomida, both of Aichi-ken (JP)

(73) Assignee: Kabushiki Kaisha Tokai-Rika-Denki-Seisakusho, Aichi-ken (JP)

( * ) Notice: Under 35 U.S.C. 154(b), the term of this patent shall be extended for 0 days.

(21) Appl. No.: 08/812,455

(22) Filed: Mar. 6, 1997

(30) Foreign Application Priority Data

Mar. 7, 1996 (JP) .................................................... 8-050149

(51) Int. Cl.⁷ .................................................... G05G 25/04
(52) U.S. Cl. ............................................................ 74/566
(58) Field of Search ............................... 74/566; 116/28.1

(56) References Cited

U.S. PATENT DOCUMENTS

| | | | |
|---|---|---|---|
| 3,285,093 | * 11/1966 | Sellmeyer | 74/566 |
| 4,964,359 | 10/1990 | Richmond . | |
| 5,680,799 | * 10/1997 | Nukatsuka et al. | 74/566 |
| 5,855,182 | * 1/1999 | Kline et al. | 116/28.1 |

FOREIGN PATENT DOCUMENTS

| | | | |
|---|---|---|---|
| 5189073 | * 7/1993 | (JP) | 74/566 |
| 835557 | 2/1996 | (JP) . | |

OTHER PUBLICATIONS

British Search Report for corresponding British appliction GB 9704687.4, May 1997.

* cited by examiner

*Primary Examiner*—Mary Ann Green
(74) *Attorney, Agent, or Firm*—Nixon Peabody LLP; Thomas W. Cole

(57) ABSTRACT

A shift lever device enables liquid such as drinking water or the like to be smoothly drained to the outside when liquid is accidently spilled on the device. The shift lever device has a housing that includes a side wall where a drain is formed. In one embodiment, the upper surface of the housing includes a projecting portion in the form of a rib for guiding liquid spilled on the housing to the drain of the side wall. Alternatively, the device includes a liquid guard roof overhanging from an upper edge of an aperture of the side wall of the housing for guiding spilled liquid into the drain. The shift lever device may also include a liquid escaping gap being provided at a bearing potion of the housing by which a slide cover is slidably supported; a liquid receiving gutter for receiving the liquid drained from the liquid escaping portion; and a drainage hole in the side wall of the housing, whereby the drained liquid is guided to a place outside of the interior of the housing.

13 Claims, 11 Drawing Sheets

F I G. 8
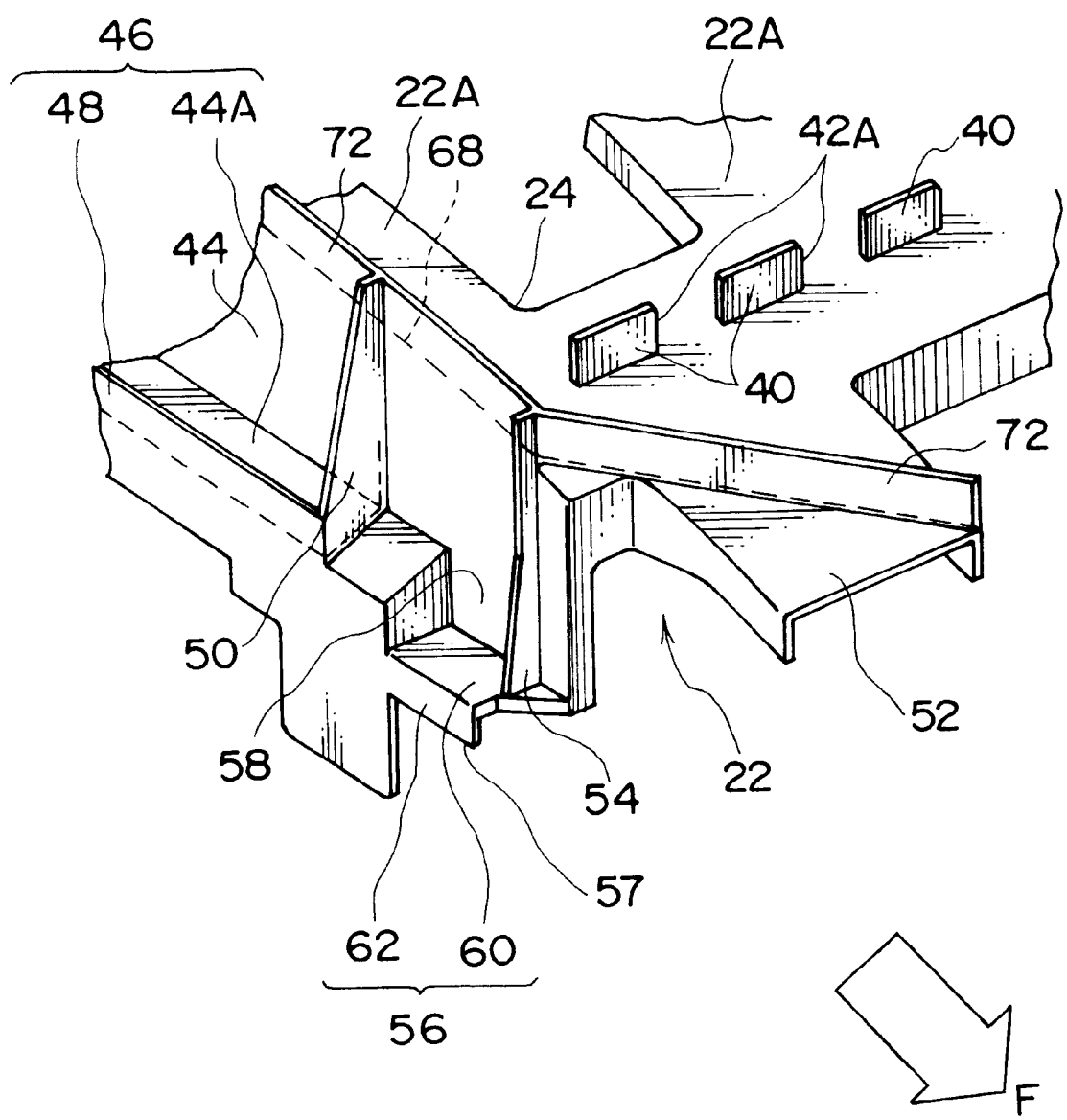

SHIFT LEVER DEVICE

BACKGROUND OF THE INVENTION

1. Field of the Invention

The present invention relates to a shift lever device for a shifting operation of a speed change gear of a vehicle.

2. Description of the Related Art

One general type shift lever device for a shifting operation of an automatic speed change gear of a vehicle is arranged on a floor of the vehicle, as illustrated in FIG. 11, so that a shift lever 10 can be operated in a longitudinal direction of the vehicle to be shifted to a selected shifting position.

In this general type shift lever device, a base portion of the shift lever 10 is commonly covered with a shift lever housing. The shift lever housing is generally arranged in a console panel 17 in the interior of the vehicle, with embedded therein, and is provided with a panel lowered in position with respect to the console panel and having at its top surface an elongate slot-like aperture 14 extending over a shifting range of the shift lever 10. In the aperture 14 a slide cover 16 having a through bore is slidably fitted and a shaft portion of the shift lever 10 is inserted in the through bore of the slide cover 16, so that, when the shift lever 10 is operated to shift to a selected shifting position, the slide cover 16 is slid together with the shift lever to allow the aperture 14 of the panel to be always closed, so as to conceal internal equipment from outside.

This conventional type shift lever device is located at a bottom center part of the instrument panel 18. An area around this part of the instrument panel is suitable for placing a canned drink or the like, and also a drawer type, drinking water pan 19 is sometimes provided at an area above that area, so that drinking water or the like may sometimes happen to drip down on the console panel 17. In this case, the dripped drinking water is easy to stay in a recessed part of the console panel 17 lowered in position with respect of the same, and accordingly, cleaning the recessed part requires much time and labor.

SUMMARY OF THE INVENTION

To eliminate or minimize the above described disadvantage involved in the prior art, the present invention has been made. It is the object of the present invention to provide a novel shift lever device which is so constructed that even when liquid such as drinking water or the like is dripped down on the shift lever device, the internal equipment can be kept from getting wet in the dripped liquid.

According to the first aspect of the invention, there is provided a shift lever device for a shifting operation of a speed change gear of a vehicle comprising:

- a housing for covering a lower part of a shift lever, the housing having a top surface;
- a projecting portion(s), provided on the top surface of the housing with projecting therefrom to rise up like a rib, for guiding liquid dripped down on the top surface of the housing; and
- a groove portion formed by the projecting portion partially cut out or a groove portion at which a drain is formed between two projecting portions.

The shift lever device thus constructed enables the liquid dripped down on the top surface of the housing on the interior side of the vehicle to be guided by the projecting portion(s) to a place where internal equipment is kept from getting wet in the liquid drained from the groove portion.

According to the second aspect of the invention, there ore is provided a shift lever device for a shifting operation of a speed change gear of a vehicle which comprises:

- a housing for covering a lower part of a shift lever, the housing having a side wall; and
- a drain formed at the side wall of the housing, the drain being formed into a groove opening at the top so that when liquid is drained onto an outer surface of the housing, the drained liquid can be guided to a place where internal equipment is kept from getting wet in the drained liquid.

The shift lever device thus constructed can provide the result that even when the liquid dripped down on the top surface of the housing on the interior side of the vehicle is flown over the side wall, the liquid will be flown into the drain and then is discharged to a place where the internal equipment is kept from getting wet in the liquid drained through the drain.

According to the third aspect of the invention, there is provided a shift lever device for a shifting operation of a speed change gear of a vehicle which comprises:

- a housing for covering a lower part of a shift lever, the housing having a side wall having an aperture confronting an electrical component, a mechanism vulnerable to moisture, or the like; and
- a liquid guard roof overhanging from an upper edge of the aperture of the side wall of the housing.

The shift lever device thus constructed can provide the result that even when the liquid dripped down on the top surface of the housing on the interior side of the vehicle is flown round to the side wall, the dripped liquid can be flown over the liquid guard roof to prevent the electrical component, a mechanism vulnerable to moisture, or the like disposed under the liquid guard roof from getting wet in the drained liquid.

Further, according to the fourth aspect of the invention, there is provided a shift lever device for a shifting operation of a speed change gear of a vehicle comprising:

- a housing for covering a lower part of a shift lever, the housing including an aperture in which a shift lever is so loosely inserted as to be swingable, a bearing portion for swingably supporting a slide cover for covering the aperture of the housing, an inner wall, and a side wall;
- a liquid escaping portion for allowing liquid to be escaped therefrom, the liquid escaping portion being provided at the bearing portion of the housing;
- a liquid receiving gutter provided at the inner wall of the housing so that liquid drained from the liquid escaping portion can be received; and
- a drainage hole, communicating with the liquid receiving gutter and passing through the side wall of the housing, for guiding the liquid to an outside place where interior equipment is kept from getting wet in the liquid drained.

The shift lever device thus constructed can provide the result that the liquid dripped down on the slide cover lowered in position from top surface of the housing on the interior side of the vehicle is flown from the liquid escaping portion into the receiving gutter at the inside of the housing and then is led to the outside of the housing, passing through the drainage hole, so that the drained liquid is flown out in a direction in which no internal equipment is provided.

As described above, the shift lever device according to the invention can provide an advantage that even if liquid such as drinking water or the like is dripped down on the shift lever device, the interior equipment can be prevented from getting wet in the liquid.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 8 is a perspective view showing a main part of the housing of the shift lever device according to the third embodiment of the invention;

DETAILED DESCRIPTION OF THE PREFERRED EMBODIMENT

Figure 1:
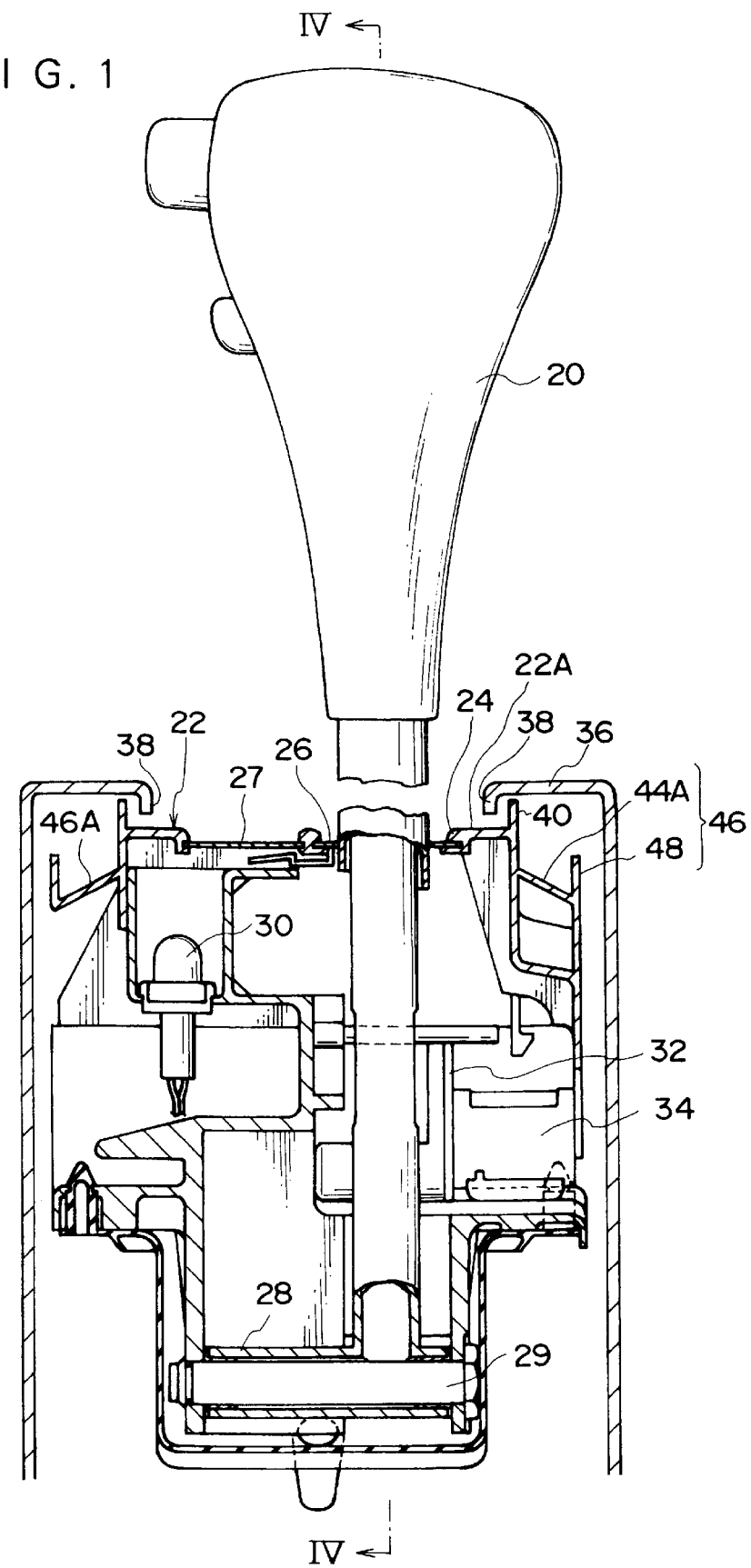
FIG. 1 is a vertical sectional view of the shift lever device according to the first embodiment of the invention taken on line I—I of FIG. 4.

The shift lever device according to the first embodiment of the invention is constructed as illustrated in FIGS. 1 to 4. A housing 22 for covering a lower part of a shift lever 20 is surrounded at the top surface 22A on the interior side of a vehicle by a console 36.

At the top surface 22A of the housing 22 on the interior side of the vehicle, a slide cover 26 having a through bore is slidably fitted in a slot-like aperture 24 extending over a shifting range of the shift lever 20, and a shaft portion of the shift lever 20 is inserted in the through bore of the slide cover 26. When the shift lever 20 is shifted to a selected shifting position, the slide cover 26 is slid together with the shift lever 20, to always close the aperture 24 of the housing 22.

Further, at the top surface 22A of the housing 22 on the interior side of the vehicle, a shift range indicating portion 27 for indicating a shifted position of the shift lever 20 is provided in parallel to the aperture 24.

At the bottom of the housing 22, an axial pin 29 inserted in a cylindrical bearing portion 28 of a base end of the shift lever 20 is supported, via which the shift lever 20 is rotatably supported to the housing 22. Also, the housing 22 is provided therein with equipment comprising electrical components such as a lamp unit 30, a detent unit 32 and a shift lock unit 34.

The top surface 22A of the housing 22 on the interior side of the vehicle is curved so that the lengthwise central portion thereof has convexity protruding toward the interior of the vehicle. The console 36 is disposed to surround the periphery of the top surface in a rectangular frame form. A rectangular-shaped aperture of the console 36 facing the interior of the vehicle has a marginal portion 38 bent at its free end toward the housing 22 like a hook.

A projection 40, rising approximately 10 mm from the top surface of the housing 22 toward the rear side of the console 36 like a rib, is provided on the top surface 22A of the housing 22 on the interior side of the vehicle under the console 36 and in the vicinity of the marginal portion 38, so as to prevent a coin or the like from dropping from a gap between the marginal portion 38 of the console 36 and the top surface of the housing 22.

Figure 2:
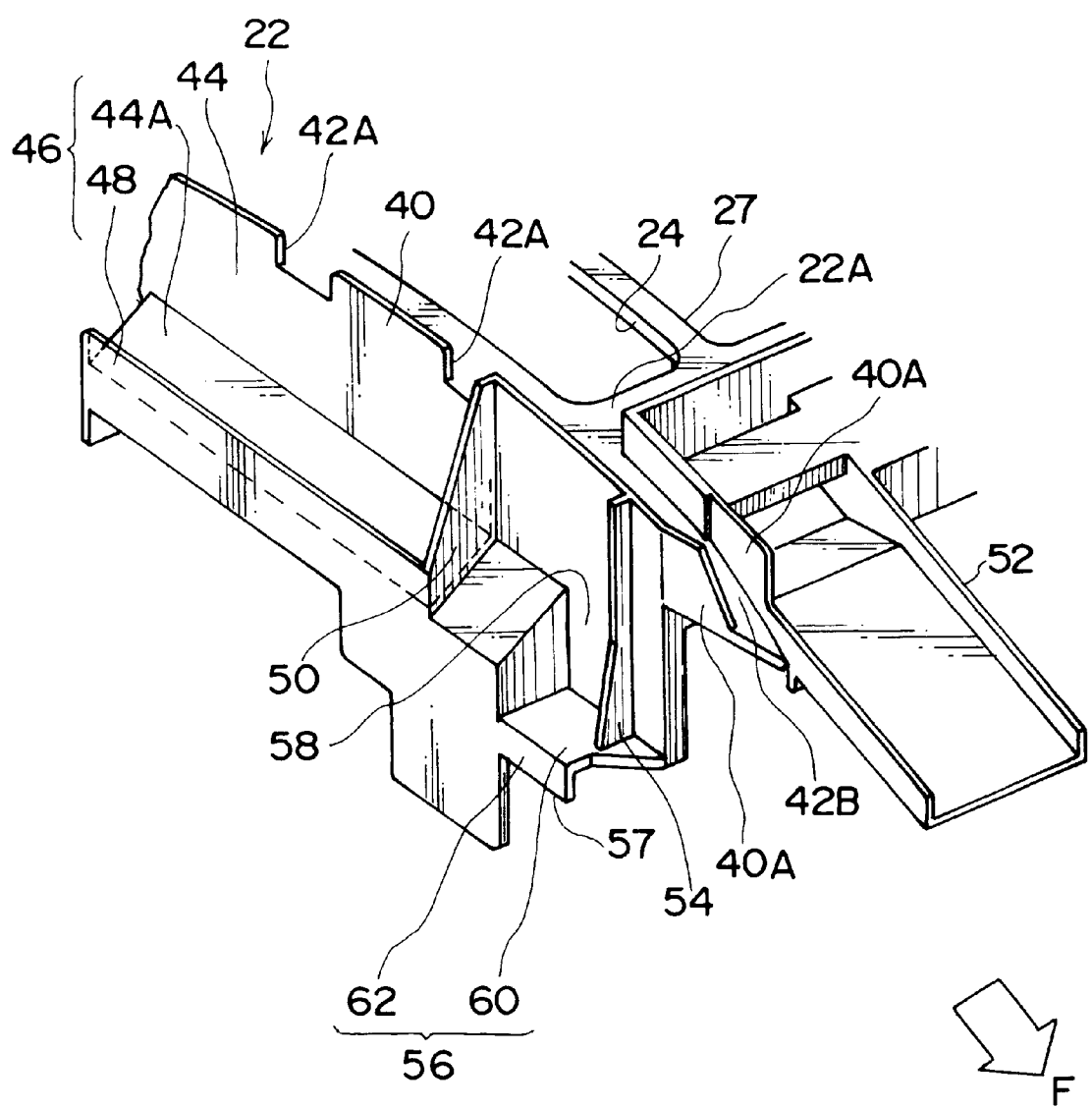
FIG. 2 is a perspective view showing a main part of the housing of the shift lever device according to the first embodiment of the invention.

Drainage grooves 42A are formed in the projection 40 at adequate intervals. As shown in FIG. 2, the drainage grooves 42A are formed by partially cutting out the projection 40 rising up like a rib, or a drainage groove 42B, at which a U-shaped, groove-like drain for guiding liquid to a proper position on the housing 22 is formed, is formed by the projection 40 rising up like a rib.

Figure 3:
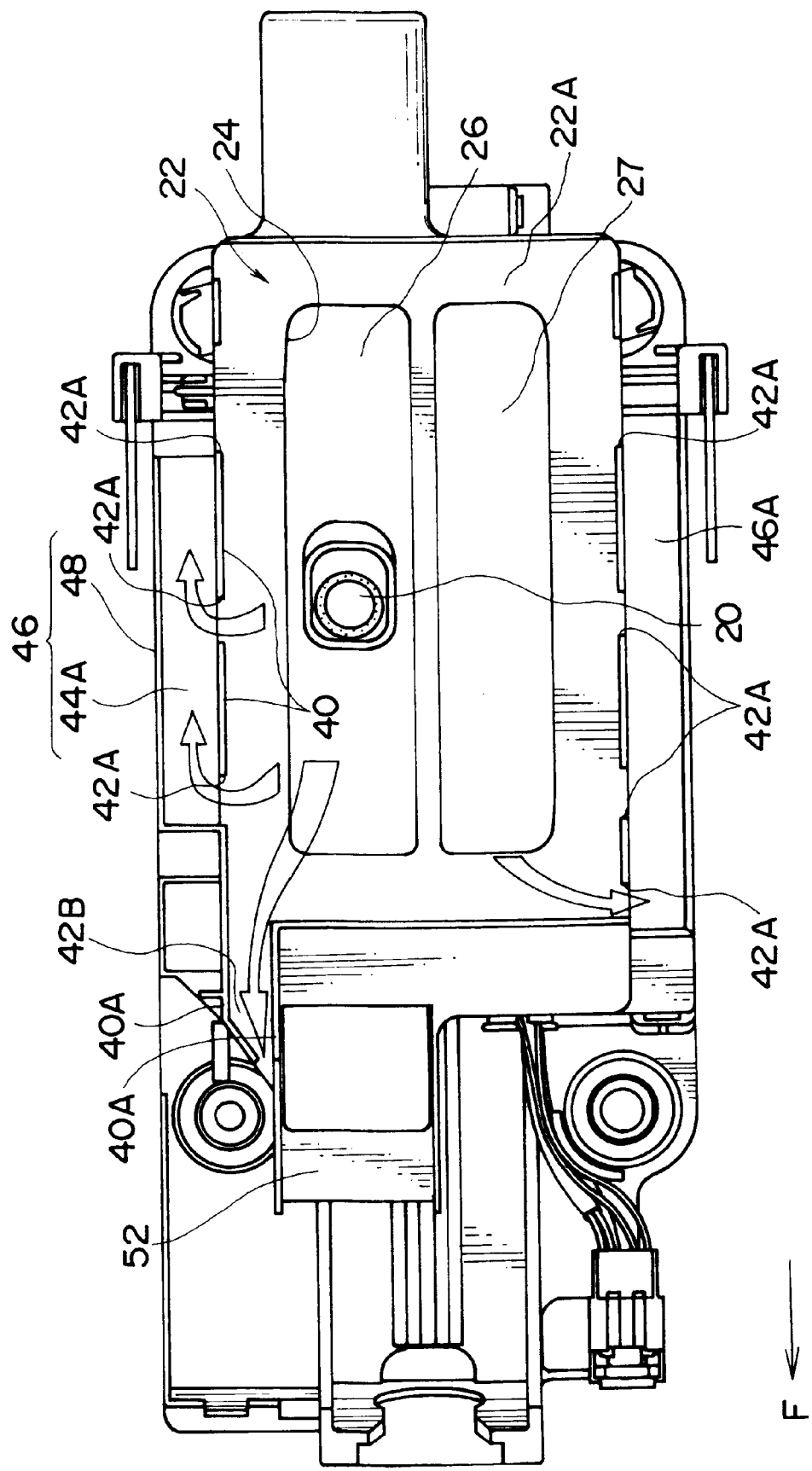
FIG. 3 a schematic plan view of the shift lever device according to the first embodiment of the invention.
Figure 4:
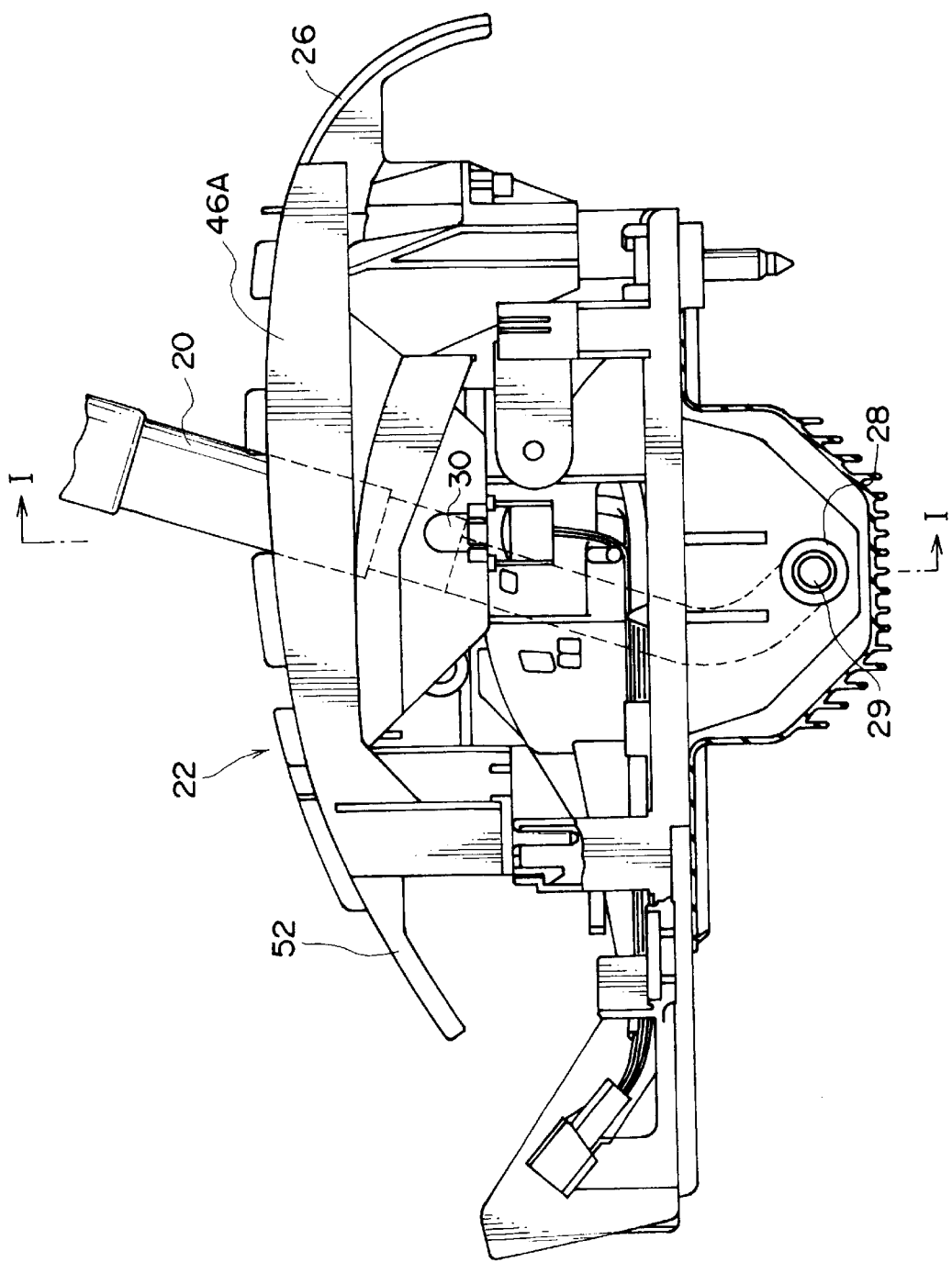
FIG. 4 is a vertical sectional view of the shift lever device according to the first embodiment of the invention taken on line IV—IV of FIG. 1.

Specifically, as shown in FIG. 3, the drainage grooves 42A are formed by cutting out the projection 40 rising along a shifting direction of the shift lever 20 at substantially uniform intervals (at four positions in the illustrated embodiment). The drainage groove 42B is provided at a portion of the housing 22 which will be on the front side F of the vehicle when the housing 22 is installed in the vehicle and at an opposite side of the aperture 24 to the shift range indicating portion 27, and is formed by two parallel projections 40A extending to the front side F of the vehicle in the form of the U-shaped, groove-like, drain.

As shown in FIG. 2, the drainage groove 42B defined between the two projections 40A extends downward obliquely from the lengthwise central portion of the convexly curved top surface 22A of the housing 22 on the interior side of the vehicle to a position at the lateral side of a guide portion 52 for the slide cover 26 and opens at the free end, so as to lead the liquid dripped on the top surface 22A of the housing 22 on the interior side of the vehicle to escape to a place on the front side F of the vehicle where the interior equipment is kept from getting wet in the liquid. The guide portion 52 for the slide cover 26 projects from an end of the housing 22 on the front side F of the vehicle in the form of a rectangular projecting piece, to guide a free end of the slide cover 26 therealong.

The housing 22 has a drain 46 at the side wall 44 on the right side toward the front side F of the vehicle. The drain 46 is arranged along the longitudinal direction of the vehicle at a central position in the height of the side wall 44. The drain 46 comprises (i) the side wall 44 of the housing 22 which is folded like a stepped wall to form a stepped portion 44A and (ii) a groove wall 48 which rises about 10 mm from an outer end of the stepped portion 44A in such a manner as to be flush with a side wall extending downward from the outer end of the stepped portion 44A, so that it is formed in the form of a U-like groove which is opened at the top.

The drain 46 is closed at one end thereof on the front side of the vehicle by a rib 50 projecting from the side wall of the housing 22 on the front side F of the vehicle, and is opened, at the other end thereof on the rear side of the vehicle, to an end of the housing 22 in the rearward direction of the vehicle (to the opposite side to that indicated by the arrow F).

Also, the housing 22 has a drain 46A at the other side wall 44 on the shift range indicating portion 27 side or on the left side to the front side of the vehicle. The drain 46A is arranged along the longitudinal direction of the vehicle and is formed by a gutter member of a U-like section projected from the side wall 44 on the left side toward the front side of the vehicle.

In the shift lever device of the first embodiment of the invention, no electrical components, a mechanism vulnerable to moisture or the like are disposed near the one end portion of the housing 22 on the front side of the vehicle and near the other end portion of the housing 22 on the rear side of the vehicle.

A liquid guard roof 56 is formed at a side wall 58 of the housing 22 between two ribs 50, 54 which are provided between the guide portion 52 for the slide cover 26 and the drain 46. The liquid guard roof 56 comprises a flat plate portion 60 extending horizontally from the side surface of the side wall 58 and a vertical plate portion 62 bending from a free end of the flat plate portion 60 like a hook and extending downward about 8 mm.

The liquid guard roof 56 is provided at a part of the housing 22 at which an opening is indispensably provided for the assembling work of the shift lever device to the vehicle, to cover the electrical components or mechanism vulnerable to moisture disposed in that part of the housing 22. When a large amount of liquid dripped down on the top surface 22A on the interior side of the vehicle at the opening 57 of the housing 22 overflows the projection 40, it flows along the horizontal plate 60 and the vertical plate 62 and is guided to a place where the interior equipment is kept from getting wet in the liquid. Thus, the liquid guard roof can prevent the overflowing liquid adhering to part of the housing on the interior side of the vehicle at the opening 57 covered with the liquid guard roof 56. In the shift lever device according to the first embodiment of the invention as illustrated in FIG. 2, the housing 22 has an opening to connect an end of a push-pull cable drawn from a key cylinder mounted on the driver's seat side of the vehicle to a cable connecting end of a mechanical type key interlocking mechanism (not shown) disposed in the housing 22, and the liquid guard roof 56 is provided at the opening of the housing 22, to prevent the liquid adhering to the cable connecting ends and the key interlocking mechanism.

Figure 5:
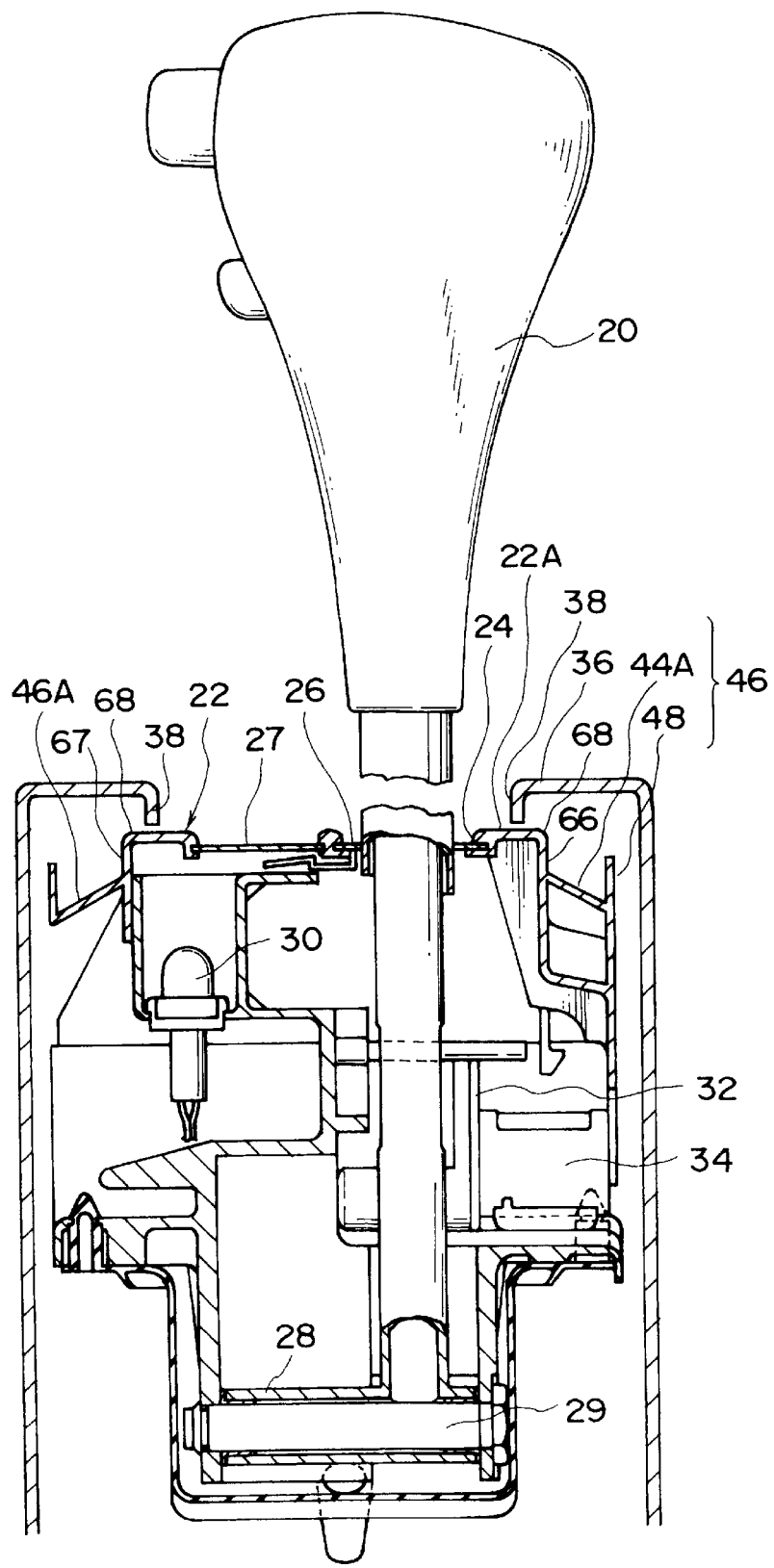
FIG. 5 is a vertical sectional view of the shift lever device according to the second embodiment of the invention corresponding to that taken on line I—I of FIG. 4.

Next, referring now to the FIGS. 5 through 7, the second embodiment of the invention is described below. In the second embodiment of the invention, differently from the first embodiment, the projections are not provided at the corners 68 of the two side walls 66, 67 of the housing 22 extending along the longitudinal direction of the aperture 24 in the top surface 22A on the interior side of the vehicle. Instead, the marginal portion 38 of the console 36 is extended further toward the top surface 22A on the interior side of the vehicle, to prevent coins or the like from falling from between the marginal end 38 and the top surface 22A on the interior side of the vehicle.

The side wall 66 of the housing 22 adjacent to the aperture 24 is provided with a drain 46, similar to that in the first embodiment. The drain 46 includes a groove wall 48 which rises from a stepped portion 44A and is formed in the form of a U-like groove. The drain 46 is closed at one end thereof on the front side F of the vehicle by a rib 50, and opens, at the other end thereof on the rear side of the vehicle, to a part of the housing 22 on the rear side of the vehicle at which no internal equipment is provided.

Figure 6:
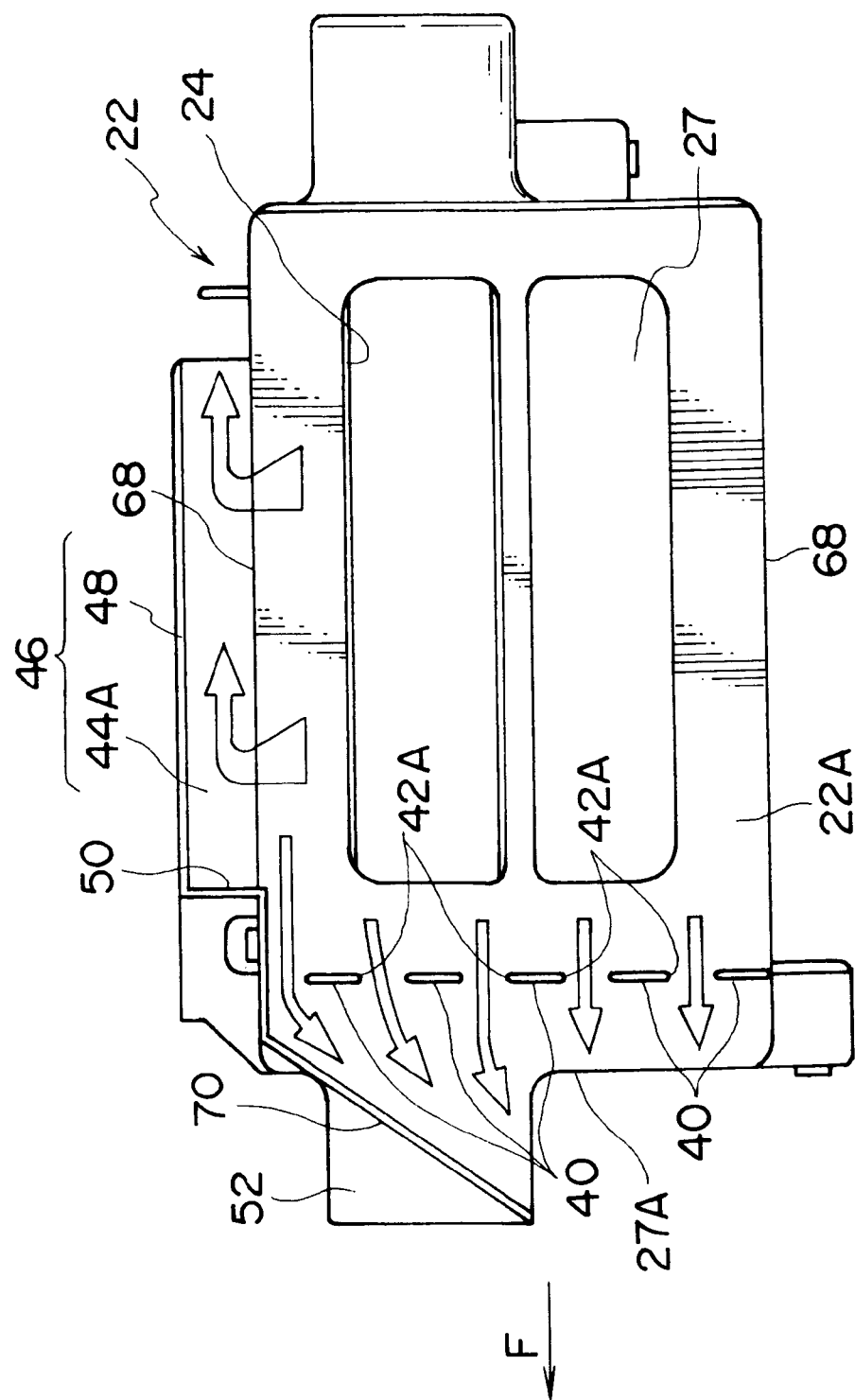
FIG. 6 is a schematic plan view of a housing part of the shift lever device according to the second embodiment of the invention.

As shown in FIG. 6, projections 40 are provided near the end of the housing 22 on the front side F of the vehicle. The projections 40 are arranged along a transverse direction of the vehicle with rising from the top surface 22A of the housing 22 on the interior side of the vehicle. A plurality of grooves 42A are formed at proper intervals at the projections 40 (five grooves formed at uniform intervals in FIG. 6).

A line of guiding projection 70 is formed on the top surface 22A of the housing on the interior side of the vehicle. The guiding projection 70 extends from a rib 50 toward the front side F of the vehicle and then bends to extend obliquely across a guide portion 52 for the slide cover 26 toward a center line of the housing 22 into a free end of a guide portion 52. In the second embodiment of the invention, a top surface of the guide portion 52 for the slide cover 26 forms an extension of a flat surface of the top surface 22A of the housing 22 on the interior side of the vehicle. The slide cover 26 is slidably guided by a bottom surface of the guide portion 52.

Figure 7:
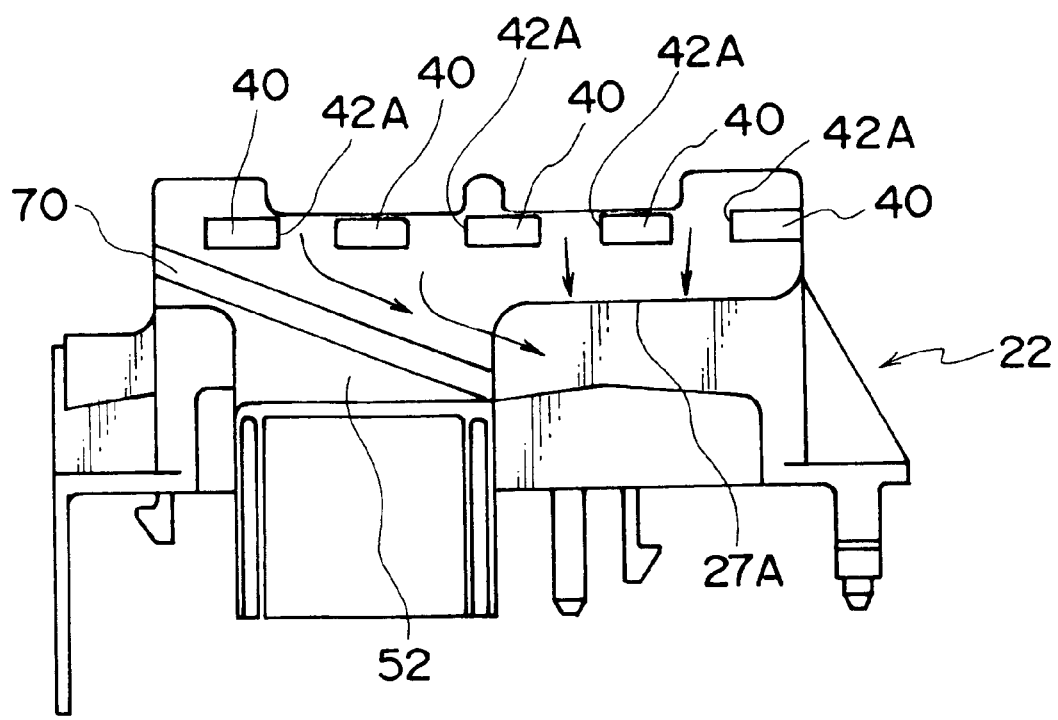
FIG. 7 is a partly sectional side view of the housing part of the shift lever device according to the second embodiment of the invention.

When liquid is dripped down on the top surface 22A of this constructed housing 22 on the interior side of the vehicle, the liquid is flown along the convex curvature of the top surface 22A of the housing 22, as shown in FIG. 7. After passing through the grooves 42A, the liquid is guided by the guiding projection 70 to flow from the end 27A on the shift range indicating portion 27 side of a longitudinally extending center line of the aperture 24 of the housing 22 into a place where no components vulnerable to liquid are provided.

Accordingly, the electrical components or moisture vulnerable mechanism disposed in the housing 22 at a part thereof between the guide portion 52 of the slide cover 26 and the rib 50 can be kept from getting wet in the liquid.

It is noted that since the construction, operation and effect of the second embodiment other than those mentioned above are the same as those of the first embodiment, like elements are given the same reference numerals or characters and the detailed description thereon is omitted.

Next, referring to the FIG. 8, the third embodiment of the invention is described below. In the third embodiment of the invention, a series of guiding projections 72 is provided rising and extending along the corner 68 between the side wall 44 adjoining the aperture 24 of the housing 22 and the top surface 22A of the housing on the interior side of the vehicle. The guiding projections 72 are so formed on the housing 22 as to continuously extend from the guide portion 52 for the slide cover on the front side of the vehicle to the rear side. The guiding projections 72 are not provided with any grooves, differently from the above described first embodiment.

The side wall 44 of the housing 22 adjacent to the aperture 24 is provided with the drain 46, as is the case with the first embodiment. The drain 46 includes the groove wall 48 rising from the stepped portion 44A and is in the form of a U-like groove. The drain 46 is closed at one end thereof on the front side F of the vehicle by the rib 50, and opens at the other end thereof to a portion of the housing 22 in the rear side of the vehicle at which no components vulnerable to liquid is provided.

Further, projections 40 are provided which rises from the top surface 22A of the housing 22 on the interior side of the vehicle near to the end of the top surface 22A on the front side F of the vehicle, as is the case with the second embodiment. A plurality of grooves 42A are provided at the projections 40.

In addition to this, a liquid guard roof 56 is formed on a side wall 58 of the housing 22 between two ribs 50, 54 which are provided between the guide portion 52 for the slide cover 26 and the drain 46. The liquid guard roof 56 comprises a flat plate portion 60 extending from the side wall 58 and a vertical plate portion 62 bending from the flat plate portion 60 like a hook and extending downward.

In the shift lever device thus constructed according to the third embodiment of the invention, when liquid is dripped down on the top surface 22A of the housing 22 on the interior side of the vehicle, the liquid is flown over the top surface to the front side F or the rear side of the vehicle along the curvature of the top surface of the housing while it is guided by the guiding projection 72. The liquid flowing to the front side F of the vehicle passes through the grooves 42A and flows over the guide portion 52 for the slide cover 26 while being guided by the guiding projection 72. Then, the liquid is delivered from the end of the housing on the shift range indicating portion 27 side of a center line of the housing 22 to a place where the interior equipment is kept from getting wet in the liquid.

Also, even when the liquid is dripped down on the top surface 22A on the interior side of the vehicle so much that it overflows the guiding projection 72 at the corner 68, the overflowing liquid flows into the drains 46, 46A and is guided by the drain to the rear side of the housing 22 with respect to the longitudinal direction of the vehicle, so as to be delivered to a place where the interior equipment is kept from getting wet in the liquid. Also, the liquid overflowing the guiding projection 72 between the two ribs 50, 54 flows over the liquid guard roof 56 and goes into a place where no components vulnerable to liquid are provided. Thus, the electrical components or mechanisms vulnerable to moisture in the housing 22 can be prevented from getting wet in the liquid.

It is noted that since the construction, operation and effect of the third embodiment other than those mentioned above are the same as those of the first or second embodiment, the same elements are given the same reference numerals or characters and the detailed description thereon is omitted.

Figure 9:
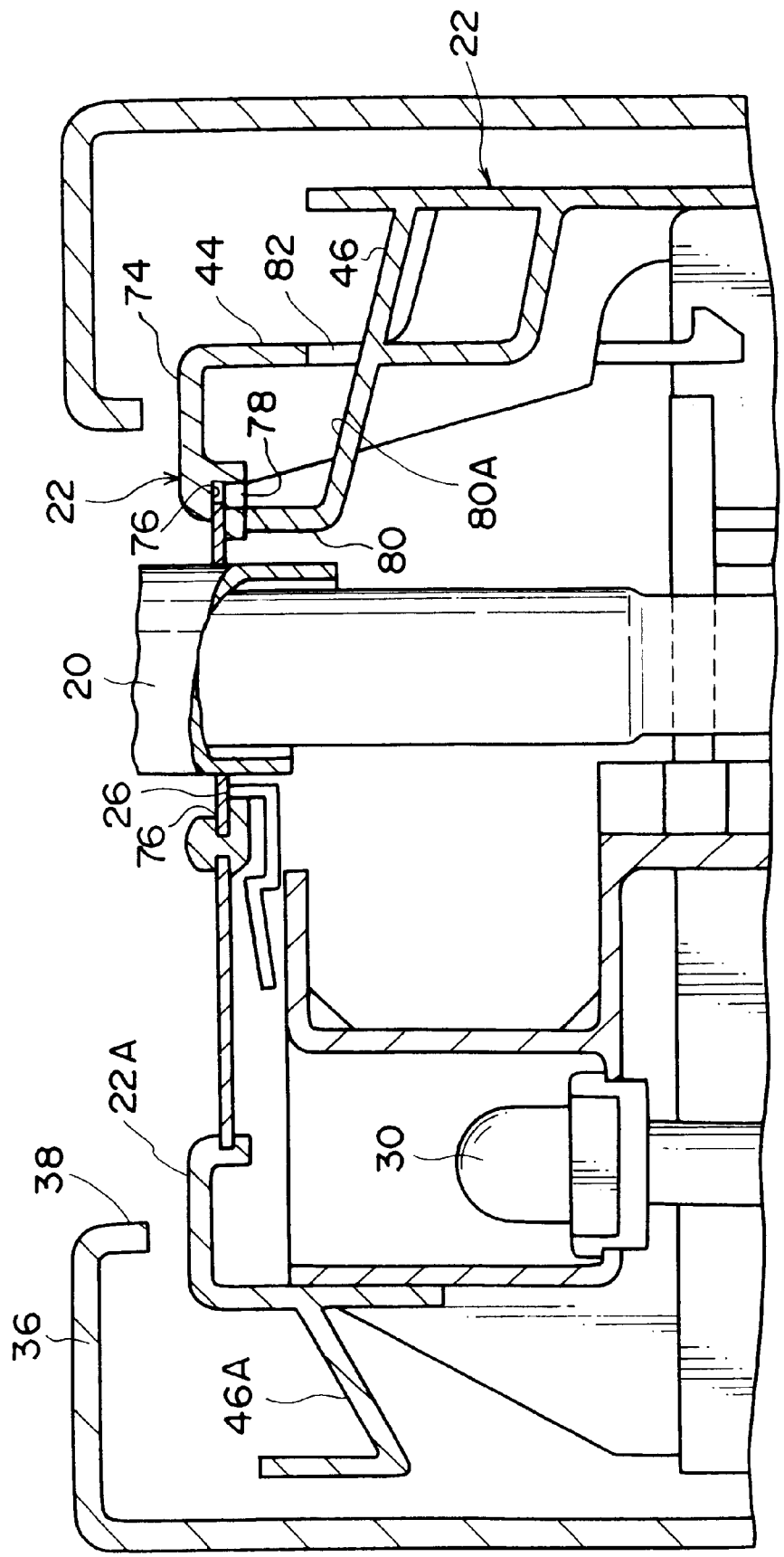
FIG. 9 is an enlarged vertical sectional view of a main part of the shift lever device according to the fourth embodiment of the invention corresponding to that taken on line I—I of FIG. 4.

Next, referring to the FIG. 9, the fourth embodiment of the invention is described below. The fourth embodiment of the invention is so constructed that the liquid flowing into a gap between the housing 22 and a sliding portion of the slide cover 26 slidably fitted therein can be drained.

In this embodiment, an elongated plate-like, flexible, slide cover 26 slid in the aperture 24 of the housing 22 is fitted in a bearing portion 74 of the housing 22 at its both lateral sides with respect to the longitudinal direction of the slide cover.

The bearing portion 74 is so formed that the both lateral sides of the slide cover 26 with respect to the longitudinal direction thereof are received by and slidably supported by guiding grooves 76 having a U-like shape or an inverted U-like shape. Liquid escaping portions 78, which are in the form of a through hole for allowing liquid to be escaped therefrom, are bored at adequate intervals in the bearing portion 74 at a part thereof with which a bottom surface of the slide cover 26 is slidably contacted.

A liquid receiving gutter 80 is disposed at a corresponding position under the liquid escaping portions 78. The liquid receiving gutter 80 is projected from the inside of the side wall 44 of the housing 22 in a U-like form in section and has an upper opening confronting a lower part of the liquid escaping portions 78. Also, an upper surface of the bottom 80A of the liquid receiving gutter 80 is so formed as to be extend downward obliquely toward the side wall 44. A drainage hole 82 is bored in the side wall 44 at a specified part thereof in continuation with a part of the upper surface of the bottom 80A.

An outlet of the drainage hole 82 is connected with the drain 46. The drain 46 comprises a groove wall 48 which rises from an outer end of the stepped portion 44A and is formed in the form of a U-like groove, as is the case with the first embodiment as illustrated in FIG. 2. The drain 46 extends forwardly and rearwardly of the vehicle along the side wall 44 and at least one end of the drain opens to a place where no elements vulnerable to liquid are provided, as is the case with the illustrated embodiment in FIG. 2.

The drain 46 is in the form of a U-like groove opened at the top with respect to the side wall 44 of the housing 22 and is so formed that it can receive the liquid, dripped down on the top surface 22A of the housing 22 on the interior side of the vehicle and then flown toward the side wall 44 through the gap between the top surface 22A and the marginal portion 38 of the console 36, and drain it toward the both ends thereof. The marginal portion 38 of the console 36 is elongated toward the housing 22 to prevent drop of coins and the like.

Next, operation of this constructed shift lever device of the fourth embodiment is described below.

When liquid is dripped down on the top surface 22A of the housing 22 on the interior side of the vehicle, the liquid flows from the lateral sides of the slide cover 26 in the longitudinal direction thereof to the inside of the housing 22 through the liquid escaping portions 78. The liquid further flows to the liquid receiving gutter 80 and passes through the drainage hole 82 to the outside of the housing 22. Further, the liquid goes along the drain 46 and is discharged to a place where no electrical components or mechanism vulnerable to moisture are provided. Thus, even if the surface of the slide cover 26 is lowered in position from top surface 22A of the housing 22 on the interior side of the vehicle, the liquid can be prevented from staying still on the surface of the slide cover 26.

In addition to this, after the liquid dripped down on the top surface 22A of the housing 22 is flown from the top surface 22A of the housing to the side wall 44 and further to the drain 46, it is guided by the drain 46 to a place where the internal equipment is kept from getting wet in the liquid.

It is noted that since the construction, operation and effect of the fourth embodiment other than those mentioned above are the same as those of the first through third embodiments, like elements are given the same reference numerals or characters and the detailed description thereon is omitted.

Figure 10:
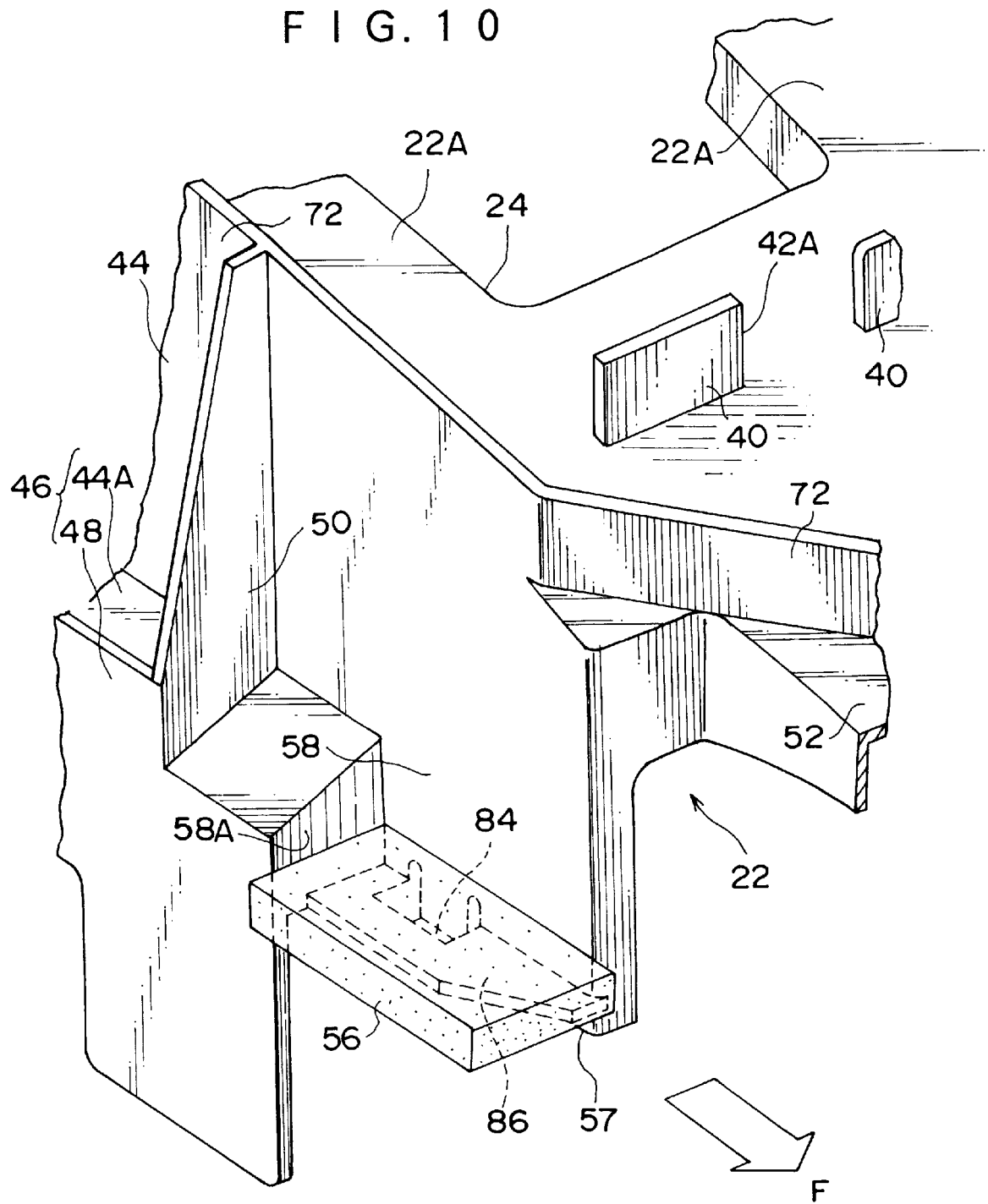
FIG. 10 is a perspective view showing a main part of the housing of the shift lever device according to the fifth embodiment of the invention.
Figure 11:
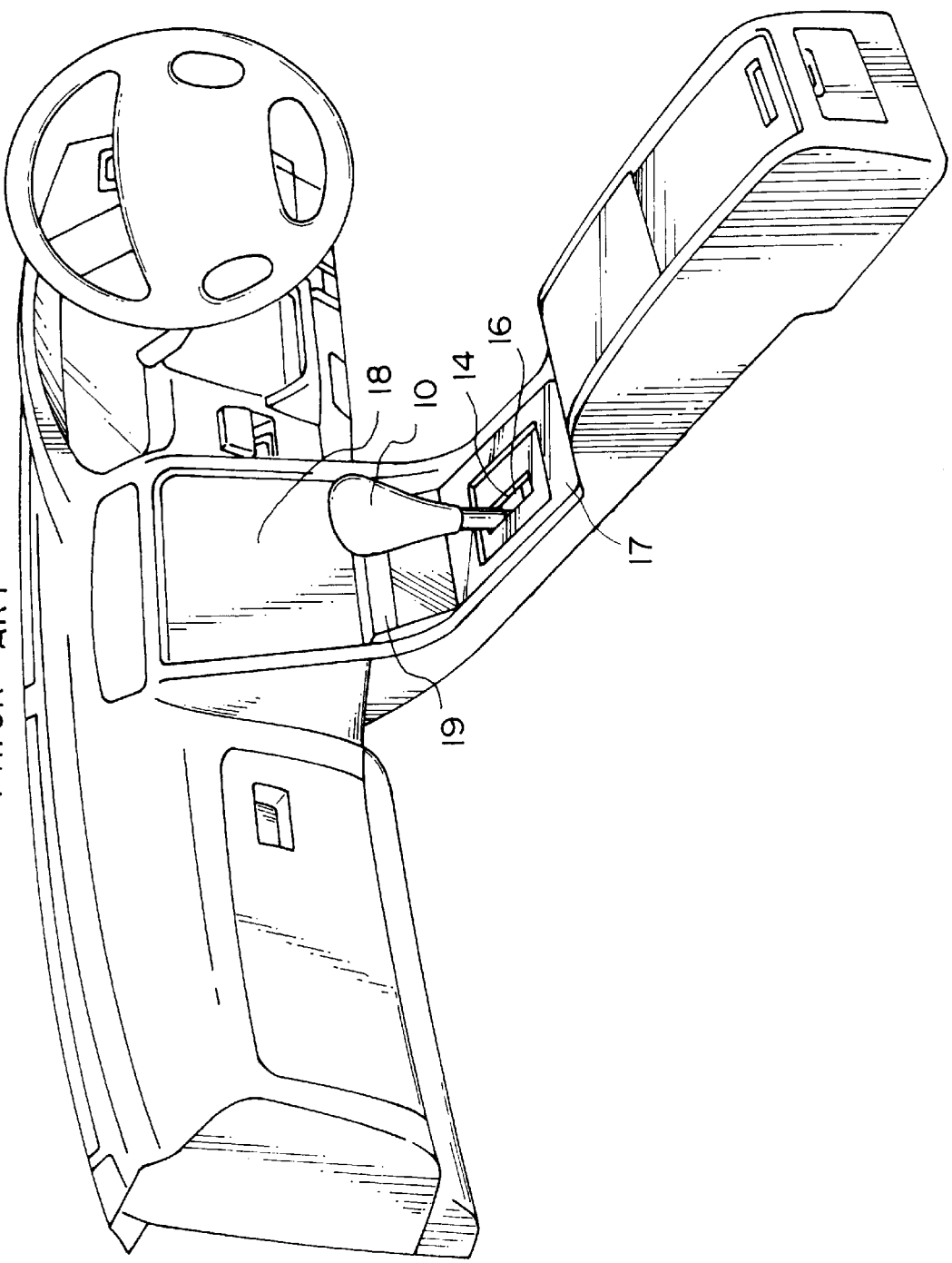
FIG. 11 is a perspective view illustrating a main part of a conventional type shift lever device mounted to the interior of a vehicle.

Next, fifth embodiment of the invention is described below, with reference to the FIG. 10. The shift lever device according to the fifth embodiment of the invention is so constructed that a liquid guard roof 56 can close a hole or equivalent formed in a part of the housing 22 and also prevent the liquid entering the inside of the housing 22. The housing 22 illustrated in FIG. 10 is provided with a fitting pawl hole 84. The fitting pawl hole 84 is formed at a proper position of the housing 22 in a hole form so that a fitting pawl (not shown) can be inserted in the hole 84 to hold the housing by an assembling machine, for assembling work of various kinds of components.

Specifically, at the side wall 58 of the housing 22 between the guide portion 52 for the slide cover on the front side F of the vehicle and the rib 50 at the lateral side of the drain 46, a flat plate portion 86 of trapezoid as viewed in plane is projected in a direction orthogonal to the side wall 58. Further, a fitting pawl hole 84 is provided in the flat plate portion 86 at a position thereof orthogonal to the side wall 58. A liquid guard roof 56 made of rectangular parallelopiped, waterproof sponge is provided on the flat plate portion 86. The rectangular parallelopiped, waterproof sponge which forms the liquid guard roof 56 is mounted on the flat plate portion 86 by adhesion so that it can be brought in intimate contact with an upper surface of the flat plate portion 86 to close the fitting pawl hole 84 and also its vertical side surfaces can be brought in intimate contact with two side walls 58 and 58A intersecting at right angles.

This liquid guard roof 56 made of waterproof sponge can provide advantages that penetration of liquid into the sponge can be prevented by virtue of the waterproof effect and that even if there is an error in the configuration of the side wall 58 and/or the side wall 58A intersecting the flat plate portion 86, the sponge can be easily deformed to eliminate gaps between the flat plate portion 86 and the side walls 58, 58A, so that the related surfaces of the sponge is brought into intimate contact with the flat plate portion 86 and the side walls 58 and 58A to prevent penetration of liquid. It should be noted that the liquid guard roof 56 of the fifth embodiment may be made of any suitable materials having properties of waterproof and flexibility, such as a rubber plate, a synthetic resin plate, or an expandable synthetic resin plate.

It is noted that since the construction, operation and effect of the fifth embodiment other than those mentioned above are the same as those of the first through fourth embodiments, like elements are given the same reference numerals or characters and the detailed description thereon is omitted.

While the embodiments of the present invention, as herein disclosed, constitute a preferred form, it is to be understood that other forms might be adopted.

What is claimed is:

1. A shift lever device for a shifting operation of a speed change gear of a vehicle, comprising:
    a shift lever movable along an axis;
    a housing for covering a lower part of the shift lever, the housing having a top surface and side walls, and
    a drain formed on one of the side walls of the housing below said top surface of said housing for receiving liquid dripped onto said top surface of said housing and guiding said liquid to a position outside of said housing, said drain including a bottom wall and a groove wall that are parallel both to the side wall onto which said drain is formed and to said axis of movement of said shift lever, said groove wall rising upwardly to form a U-like groove having an open top that conducts liquid along said axis, and
    an elongated projecting portion provided on the top surface of the housing for guiding liquid dripped onto said top surface of the housing into said drain wherein the longitudinal axis of said projection is parallel to the axis of movement of said shift lever.

2. A shift lever device according to claim 1, wherein the drain is closed at one end thereof on a front side by a rib projecting from the side wall of the housing onto which said drain is formed and is opened, at another end toward a rear portion of the housing in a longitudinal direction parallel to said axis of movement of said shift lever.

3. A shift lever device according to claim 1, wherein said projecting portion includes two projecting portions, for defining a groove portion therebetween for guiding liquid into said drain.

4. A shift lever device according to claim 1, further comprising a liquid guard roof which is overhung from an upper edge of an aperture in the side wall of the housing onto which said drain is formed wherein the aperture confronts a mechanism vulnerable to moisture.

5. A shift lever device according to claim 4, wherein the liquid guard roof comprises a flat plate portion extending horizontally from a side surface of the side wall and a vertical plate portion bending from a free end of the flat plate portion like a hook and extending downward.

6. A shift lever device for a shifting operation of a speed change gear of a vehicle which comprises:
    a housing for covering a lower part of a shift lever that is movable along an axis, the housing having a top surface and side walls, said top surface having an aperture for admitting said shift lever, and said housing including cover means closely surrounding said shift lever for preventing liquid dripped over said aperture from flowing through said top surface; and
    a drain formed on a side wall of the housing that is parallel to said axis of motion of said shift lever, and said drain having the form of a groove with an open top for receiving and guiding liquid to a place away from internal equipment kept within the housing
    wherein the drain comprises (i) a stepped portion formed in part by the side wall of the housing onto which the drain is formed and (ii) a groove wall opposite from and parallel both to said side wall and to said axis of motion of said shift lever which rises from an outer end of the stepped portion such that said drain is in the form of a U-like groove having an open top.

7. A shift lever device according to claim 6, wherein the drain is closed at one end thereof on a front side by a rib projecting from the side wall of the housing and is open at the other end thereof toward a rear portion of the housing in a longitudinal direction.

8. A shift lever device for shifting operation of speed change gear of a vehicle, comprising:
    a shift lever movable along a single axis;
    a housing for covering a lower part of a shift lever, the housing having a top surface and side walls, said top surface including an aperture for admitting the shift lever, and a slide cover means closely surrounding said shift lever and movably mounted onto said housing for closing said aperture to liquids dripped onto said top surface,
    a drain formed on one of the side walls of the housing that is parallel to said axis for receiving liquid dripped onto said top surface of said housing and guiding said liquid in a direction parallel to said axis and to the side wall onto which said drain is formed to a position outside of said housing, and
    an elongated projecting portion provided at the top portion of the housing and oriented parallel to said axis and having a groove for guiding liquid dripped onto the top surface of the housing in a direction orthogonal to said axis into said drain.

9. A shift lever device for a shifting operation of a speed change gear of a vehicle, comprising:
    a housing for covering a lower part of a shift lever, the housing having a top surface and side walls, said top surface having an aperture for admitting said shift lever, and said housing including slide cover means closely surrounding a shaft portion of said shift lever and sliding together with said shift lever for preventing liquid dripped over said aperture from flowing through said top surface; and a drain formed on at least one of the side walls of the housing below said top surface of said housing for receiving liquid dripped onto said top surface of said housing and guiding said liquid, said drain including a bottom wall and a groove wall that are parallel both to the side wall onto which said drain is formed, said groove wall rising upwardly to form a U-like groove having an open top.

10. A shift lever device according to claim 9, further comprising an elongated projecting portion provided on the top surface of the housing for guiding liquid dripped onto said top surface of the housing into said drain, wherein the longitudinal axis of said projection is parallel to said side wall.

11. A shift lever device according to claim 9, wherein said drain is formed along the longitudinal direction of the housing.

12. A shift lever device according to claim 9, wherein said drain is closed at one end thereof on a front side by a rib projecting from the side wall of the housing onto which said drain is formed and is opened, at another end toward a rear portion of the housing in a longitudinal direction.

13. A shift lever device according to claim 9, further comprising a liquid guard roof which is overhung from an upper edge of an aperture in the side wall of the housing onto which said drain is formed, wherein the aperture confronts a mechanism vulnerable to moisture.

* * * * *